(12) United States Patent
Aihara et al.

(10) Patent No.: US 7,836,307 B2
(45) Date of Patent: Nov. 16, 2010

(54) COMMUNICATION RELAY DEVICE, INFORMATION PROCESSING SYSTEM, CONTROL METHOD AND PROGRAM

(75) Inventors: Toru Aihara, Yokohama (JP); Kazumasa Ochiai, Kawasaki (JP); Noboru Kamijo, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/720,843

(22) PCT Filed: Dec. 15, 2005

(86) PCT No.: PCT/JP2005/023040
§ 371 (c)(1),
(2), (4) Date: Jun. 5, 2007

(87) PCT Pub. No.: WO2006/064872
PCT Pub. Date: Jun. 22, 2006

(65) Prior Publication Data
US 2009/0254746 A1    Oct. 8, 2009

(30) Foreign Application Priority Data
Dec. 17, 2004    (JP)    .............................. 2004-366847

(51) Int. Cl.
*H04L 9/32* (2006.01)
(52) U.S. Cl. ......................................... 713/169; 726/15
(58) Field of Classification Search .................. 713/169
See application file for complete search history.

(56) References Cited

U.S. PATENT DOCUMENTS

2002/0153998 A1    10/2002    Litwin, Jr. et al.
2003/0043028 A1    3/2003    Torikai et al.
2003/0107476 A1*    6/2003    Sahinoglu et al. ...... 340/310.01
2004/0204773 A1*    10/2004    Kim .............................. 700/9

FOREIGN PATENT DOCUMENTS

| JP | 2002-300093 | 10/2002 |
| JP | 2005-151408 | 6/2005 |

OTHER PUBLICATIONS

Rolia et al., The Method of Layers; IEEE Transactions on Software Engineering, vol. 21, No. 8, Aug. 1995; pp. 689-700.

* cited by examiner

*Primary Examiner*—Gilberto Barron, Jr.
*Assistant Examiner*—Cordelia Zecher
(74) *Attorney, Agent, or Firm*—Schmeiser, Olsen & Watts; William H. Steinberg

(57) ABSTRACT

A relay adapter, a method for processing communication data through use of a relay adapter, and a process for leasing the relay adapter to a user by a service provider. The relay adapter includes: an authentication information storage section that stores authentication information of the relay adapter; a power plug; a power socket; and a push switch within the power plug or power socket. The push switch may be depressed. The power plug is detected to be plugged into a power socket of the user. The power socket is connected to a control server by a power line carrying a power signal. Responsive to ascertaining that the push switch is not depressed, mutual authentication is enabled between the relay adapter and the control server. After the mutual authentication, communication data is relayed from an information processing device of the user to a service provider server via the control server.

23 Claims, 14 Drawing Sheets

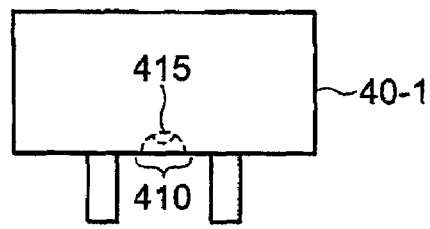
FIG. 3(b)
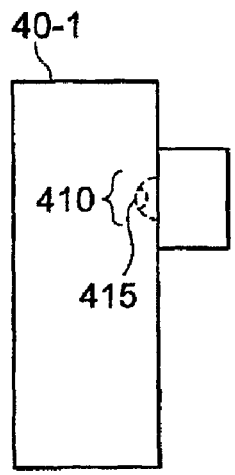 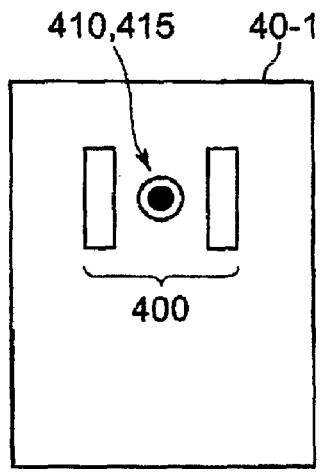 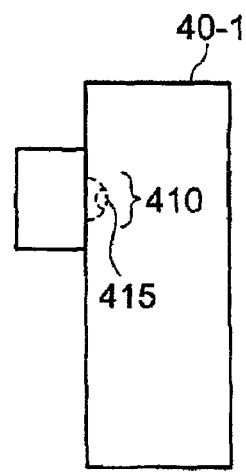
FIG. 3(d)  FIG. 3(a)  FIG. 3(e)
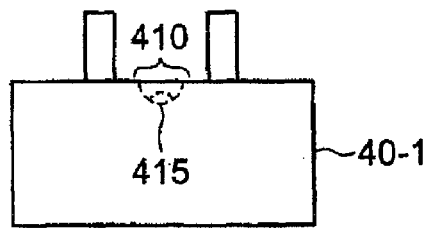
FIG. 3(c)

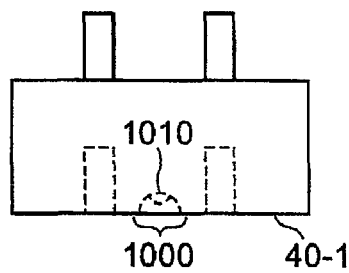
FIG. 11(b)
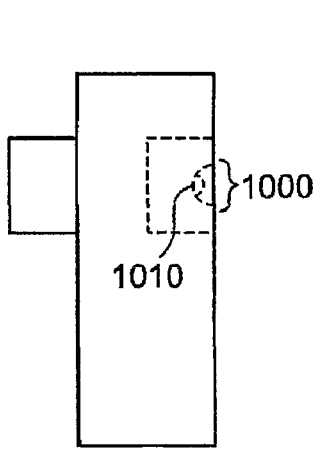
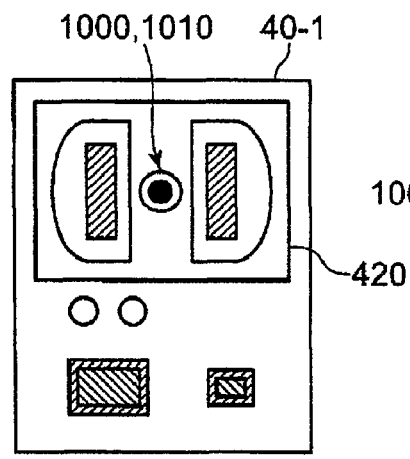
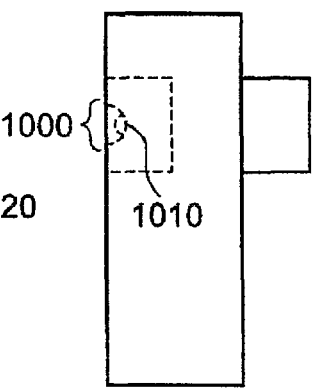
FIG. 11(d)   FIG. 11(a)   FIG. 11(e)
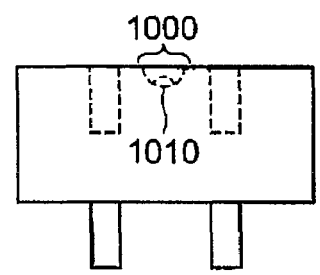
FIG. 11(c)

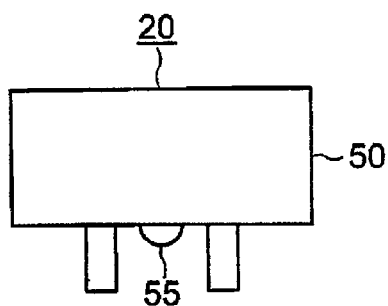
FIG. 12(b)
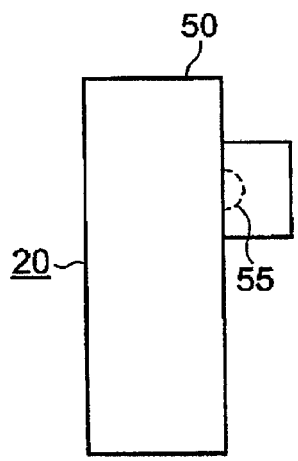 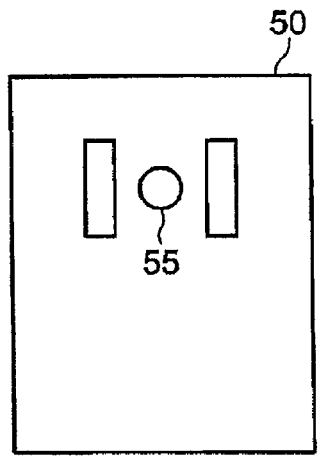 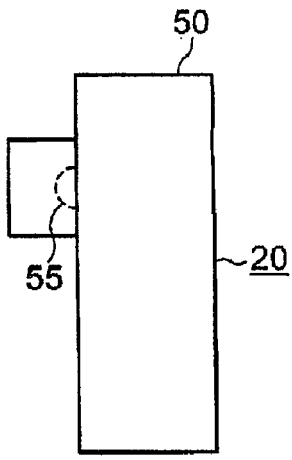
FIG. 12(d)  FIG. 12(a)  FIG. 12(e)
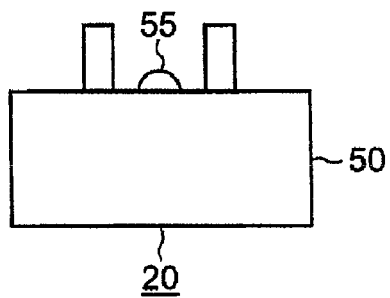
FIG. 12(c)

COMMUNICATION RELAY DEVICE, INFORMATION PROCESSING SYSTEM, CONTROL METHOD AND PROGRAM

TECHNICAL FIELD

The present invention relates to a communication relay device, an information processing system, a control method and a program. The present invention more particularly relates to a communication relay device for making connection to a communication network via a power line, and an information processing system, a control method and a program therefor.

BACKGROUND ART

In recent years, with improvement of a semiconductor technology and development of a new algorithm, power line communication (PLC) using a band of 20 MHz to 30 MHz and having a communication speed of 200 Mbps at maximum has been put to practical use (retrieve, e.g., High-Speed Power Line Communication System Overview authored by High-Speed Power Line Communication Promoter Alliance of Japan, homepage URL "http://www.plc-j.org/about_plc_system.htm", Dec. 16, 2004).

The power line communication attracts attention as the third broadband technology following ADSL using a cable and a telephone line. Especially, in Japan, the power line communication also attracts great attention as a solving method of the last mile problem in a Fiber To The Home (FTTH) service. That is, for example, when a PLC device is installed at a utility pole to perform the power line communication by use of an already laid power line, an enormous expense for newly laying an optical fiber cable from the utility pole to a house can be saved.

The PLC is a medium sharing technology. Therefore, when the PLC device is installed at a transformer of the utility pole, the communication can be performed with all power sockets to which power is supplied from the transformer. For example, in Japan, the utility pole is already provided with the optical fiber cable in many cases, and one transformer supplies power to ten to twenty houses in many cases, so the PLC will rapidly prevail. In the PLC, the communication can be performed using the power socket already disposed in the house of general household, and therefore, it is supposed that the PLC is broadly used by general users.

DISCLOSURE OF THE INVENTION

In consideration of compatibility with a conventional technology, in general, a PLC device includes an interface of Ethernet (registered trademark), USB or the like, and communication is performed based on the Internet protocol (IP) in many cases. Therefore, troublesome settings need to be performed for communication in the same manner as in a conventional personal computer, a conventional router or the like. This is not appropriate for PLC which can broadly be used by users. In the PLC, since a communication medium such as a power line is shared with neighboring houses, VPN connection and encryption of data are essential in order to retain secrecy of the communication and the like and perform the communication safely. Therefore, the settings for the communication become further complicated.

Furthermore, the PLC has convenience of being actually connectable from any place provided with a power socket, and use by a user which has not been supposed as a user of the Internet is expected. For example, a use method is supposed in which distribution of content of on-line karaoke, inventory control of an automatic vendor and the like are provided in a broadband by use of the PLC. In this case, it is necessary to appropriately select an only contractor's terminal from a broadband communication destination and provide a service to the terminal. In this case, there are necessities for not only the IP communication and the VPN connection but also device authentication and the like, and there is a high possibility that settings for the communication become further complicated.

To solve the problems, an object of the present invention is to provide a communication relay device, an information processing system, a control method and a program which can solve the above problems. This object is achieved by a combination of characteristics described in independent claims. Dependent claims define further advantageous specific examples of the present invention.

To solve the above problems, according to the present invention, there is provided a communication relay device for relaying communication data between an information processing device and a communication network by use of a power line on which a communication signal and a power signal are superimposed, the communication relay device comprising: an authentication information storage section for storing authentication information of the communication relay device; a power plug detachably attachable to a power socket for connecting an electric device to the power line; a connection detecting section for detecting that the power plug is connected to the power socket; an authentication processing section for transmitting the authentication information to a server via the power line in order to allow the server to authenticate the communication relay device, on condition that the power plug is connected to the power socket; and a communication relay section for relaying the communication data from the information processing device to the communication network, on condition that the authentication processing section succeeds in the authentication. There are also provided a control method of the communication relay device and a program which controls the communication relay device.

It is to be noted that the above summary of the present invention does not include all of examples of necessary characteristics of the present invention, and a sub-combination of groups of these characteristics might also be the invention.

According to the present invention, power line communication can safely and easily be performed with a server which provides a desired service.

BRIEF DESCRIPTION OF THE DRAWINGS

FIG. 3 shows surfaces of the communication relay adapter 40-1;

FIG. 11 shows surfaces of the communication relay adapter 40-1 according to the second modification;

FIG. 12 shows surfaces of the update adapter 50 according to the second modification;

BEST MODE FOR CARRYING OUT THE INVENTION

The present invention will hereinafter be described in accordance with a mode for carrying out the present invention, but the following embodiment does not limit the invention according to claims, and all combinations of characteristics described in the embodiment are not necessarily essential for solution means of the invention.

Figure 1:
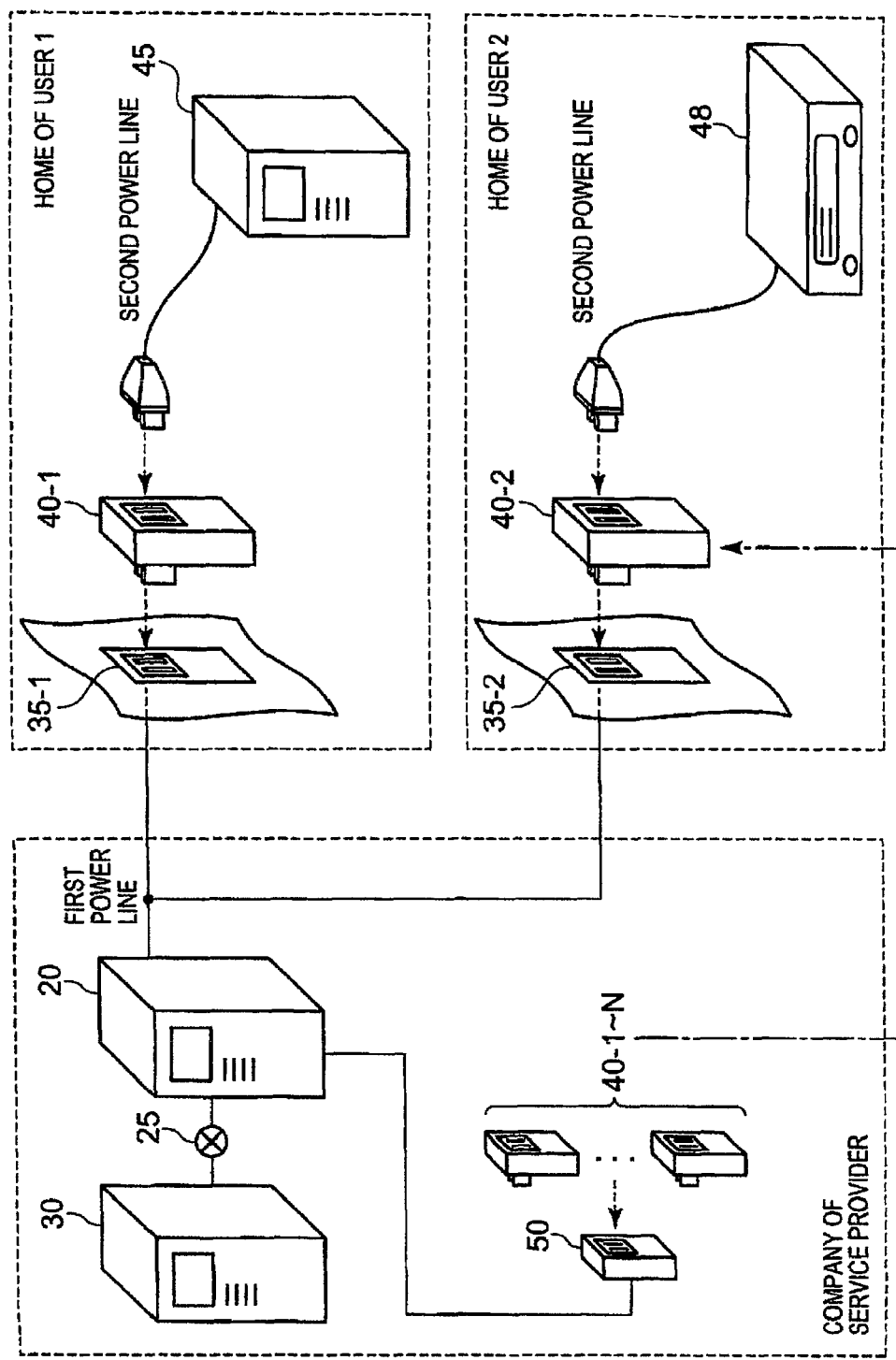
FIG. 1 schematically shows an information processing system 10.

FIG. 1 schematically shows an information processing system 10. The information processing system 10 includes a control server 20, a contracted service provider server 30, communication relay adapters 40-1 to N which are examples of a communication relay device, an information processing device 45, an on-line karaoke device 48 which is another example of the information processing device, and an update adapter 50 which is one example of an update device. The control server 20, the contracted service provider server 30 and the update adapter 50 are installed in a company of a PLC (power line communication) service provider or the like. The control server 20 controls a communication network 25. For example, the control server 20 permits an only communication device which has succeeded in mutual authentication to access the communication network 25. The contracted service provider server 30 is controlled by another service provider that has made a contract with the PLC service provider, and is connected to the control server 20 via an dedicated circuit to form the communication network 25. For example, the contracted service provider server 30 supplies tune data of on-line karaoke to the on-line karaoke device 48 or the like via the control server 20, and performs charging with respect to a lease contractor of the communication relay adapter 40-2 in accordance with an amount of the data for use or the like.

The update adapter 50 is connected to the control server 20 via the dedicated circuit. Moreover, each of the communication relay adapters 40-1 to N acquires authentication information from the control server 20 in a state in which the adapter is plugged into the update adapter 50, and the information is stored in a nonvolatile memory disposed in each of the communication relay adapters 40-1 to N. Each of the communication relay adapters 40-1 to N is leased to each of users by the service provider, and used in communication by each user. The communication relay adapter 40-1 is distributed to, for example, home of a user 1, and plugged into a power socket 35-1 in the home of the user 1 for use. The communication relay adapter 40-2 is plugged into a power socket 35-2 in home of a user 2 for use in the communication via the on-line karaoke device 48. The communication relay adapter 40-1 will hereinafter be described as a representative of the communication relay adapters 40-1 to N.

The communication relay adapter 40-1 allows the control server 20 to authenticate the communication relay adapter 40-1 via a first power line on condition that the communication relay adapter is connected to the power socket 35-1 connected to the control server 20 via the first power line. In a case where the authentication is successful, the communication relay adapter 40-1 performs cryptographic communication between the adapter and the control server 20. Furthermore, the communication relay adapter 40-1 is connected to the information processing device 45 via a second power line, and relays communication between the information processing device 45 and the control server 20. In consequence, an object is to prevent leakage of communication contents or the like and realize safe power line communication, by simply plugging the communication relay adapter 40-1 into the power socket.

Figure 2A:
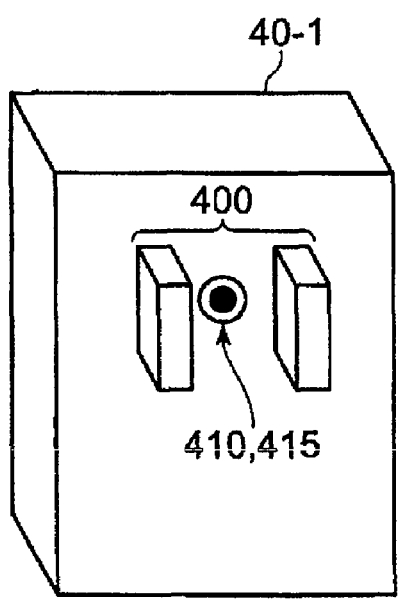
FIG. 2 shows a perspective view of a communication relay adapter 40-1.
Figure 2B:
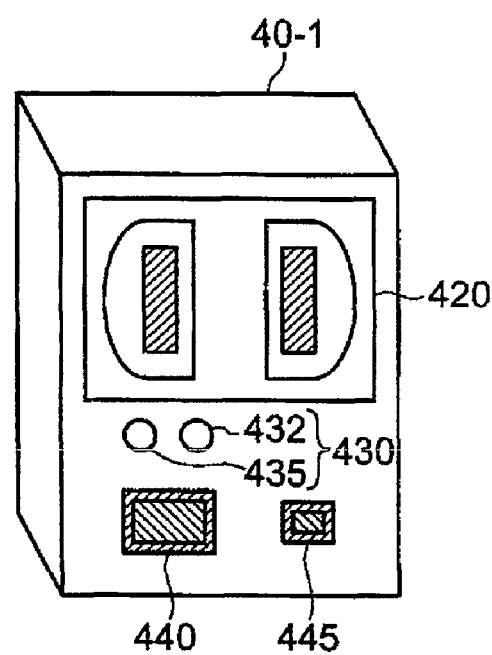
Figure 4B:
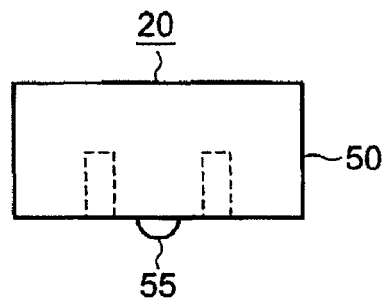
FIG. 4 shows surfaces of an update adapter 50.
Figure 4D:
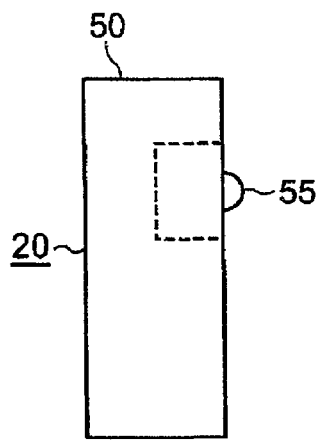
Figure 4A:
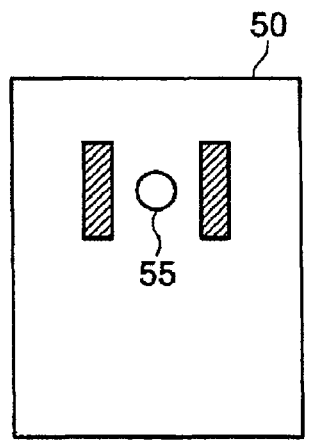
Figure 4E:
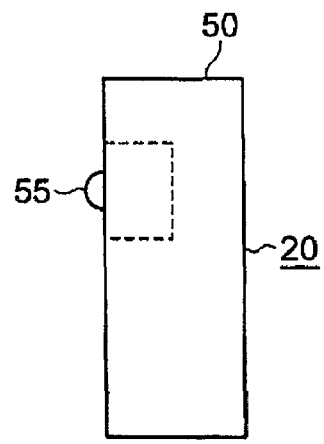
Figure 4C:
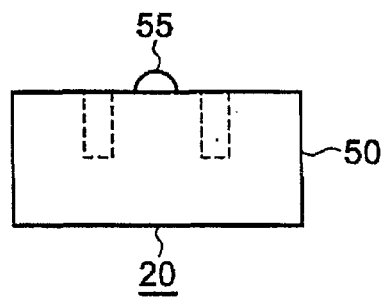

FIG. 2 shows a perspective view of the communication relay adapter 40-1. FIG. 2(a) shows a perspective view of a back surface of the communication relay adapter 40-1, and FIG. 2(b) shows a perspective view of a front surface of the communication relay adapter 40-1. FIG. 3 shows surfaces of the communication relay adapter 40-1. FIG. 3(a) shows a front view of the communication relay adapter 40-1, FIG. 3(b) shows a top plan view of the communication relay adapter 40-1, and FIG. 3(c) shows a bottom plan view of the communication relay adapter 40-1. FIG. 3(d) shows a left side view of the communication relay adapter 40-1, and FIG. 3(e) shows a right side view of the communication relay adapter 40-1. FIG. 4 shows surfaces of the update adapter 50. FIG. 4(a) shows a front view of the update adapter 50, FIG. 4(b) shows a top plan view of the update adapter 50, and FIG. 4(c) shows a bottom plan view of the update adapter 50. FIG. 4(d) shows a left side view of the update adapter 50, and FIG. 4(e) shows a right side view of the update adapter 50.

The communication relay adapter 40-1 has a power plug 400, a power socket 420, an LED unit 430, a LAN port 440 and a TEL port 445. The power plug 400 is detachably attached to the power socket which connects an electric device to the first power line. Moreover, the power plug 400 receives supply of AC power from the first power line. The power plug 400 has a concave portion 410 and a push switch 415 disposed in the concave portion 410. The concave portion 410 is disposed in the surface of the plug facing the power socket. Moreover, the push switch 415 is depressed, when the power plug 400 is plugged into a power socket of the update adapter 50 having a convex portion 55 disposed in the surface of the adapter facing the power plug 400. It is to be noted that the push switch 415 is not depressed in a state in which the power plug 400 is plugged into the usual power socket 35-1.

The power socket 420 is detachably attached to the power plug for the information processing device 45 to receive the power supply, and supplies the power supplied via the first power line to the information processing device 45 via the second power line. The LED unit 430 has an LED 432 and an LED 435. The LED 432 blinks during the authentication processing, when the communication relay adapter 40-1 allows the control server 20 to authenticate the communication relay adapter 40-1. The LED lights, when the authentication is successful. The LED 435 blinks during update processing, when the authentication information of the communication relay adapter 40-1 is updated by the update adapter 50. The LED turns off, when the update processing ends. The LAN port 440 supplies a communication signal superimposed on first power to another device having an LAN port. The TEL port 445 supplies a voice signal of IP telephone or the like in the communication signal to another device (e.g., a telephone set) having a TEL port.

Figure 5:
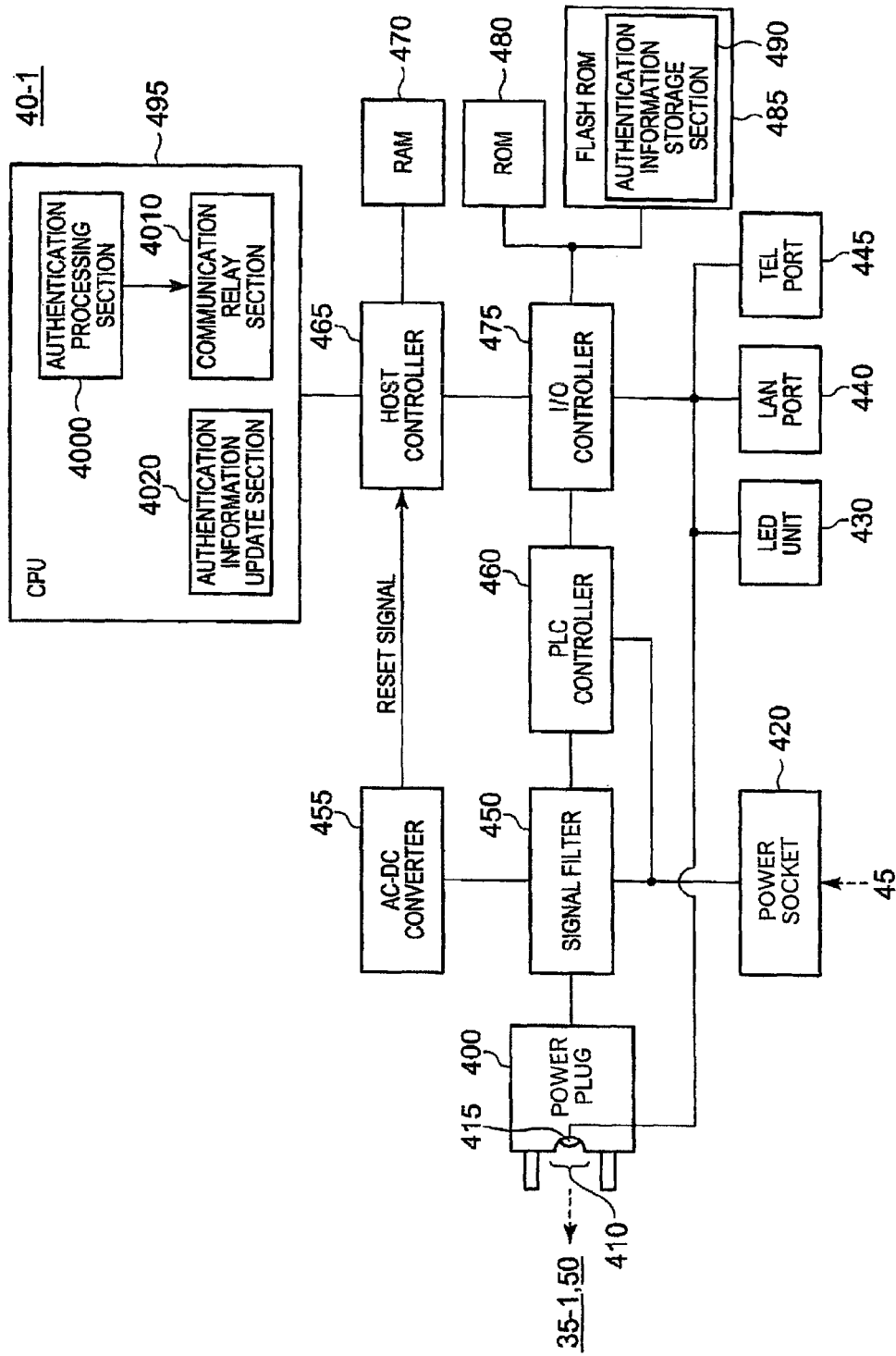
FIG. 5 shows functional blocks of classified functions of the communication relay adapter 40-1.

FIG. 5 shows functional blocks of classified functions of the communication relay adapter 40-1. In addition to the power plug 400, the power socket 420, the LED unit 430, the LAN port 440 and the TEL port 445, the communication relay adapter 40-1 has a signal filter 450, an AC-DC converter 455, a PLC controller 460, a host controller 465, a RAM 470, an I/O controller 475, a ROM 480, a flash ROM 485 and a CPU 495.

The signal filter 450 divides the AC power supplied to the power plug 400 into an electric power signal and a communication signal. Moreover, the signal filter 450 transmits the electric power signal to the AC-DC converter 455 and the power socket 420, and transmits the communication signal to the PLC controller 460. The AC-DC converter 455 converts the AC power into DC power to supply the power to each section of the communication relay adapter 40-1. The AC-DC converter 455 is one example of a connection detecting section according to the present invention, determines that the communication relay adapter 40-1 is connected to the power socket 35-1 on condition that the power supply is received from the signal filter 450, and sends a reset signal to the host controller 465.

The PLC controller 460 controls the communication using the power line, and receives the communication signal from the signal filter 450 or the power socket 420 to send the communication signal to the I/O controller 475. The PLC controller 460 receives the communication signal from the I/O controller 475, and sends the communication signal to the signal filter 450 or the power socket 420 to thereby superimpose the communication signal on the power line.

The host controller 465 connects the RAM 470 to the CPU 495 which accesses the RAM 470 at a high transfer rate. The CPU 495 operates based on programs stored in the ROM 480, the flash ROM 485 and the RAM 470, and controls each section. The input/output controller 475 connects the host controller 465 to the PLC controller 460, the LED unit 430, the LAN port 440 and the TEL port 445. The input/output controller 475 is connected to the ROM 480 and the flash ROM 485. The ROM 480 stores a boot program to be executed by the CPU 495 at a time when the communication relay adapter 40-1 starts, a program which depends on hardware of the communication relay adapter 40-1 and the like.

Moreover, the flash ROM 485 functions as an authentication information storage section 490. The authentication information storage section 490 stores the authentication information of the communication relay adapter 40-1. To prevent illegal acquisition of the authentication information, it is preferable that the authentication information storage section 490 encrypts and stores the authentication information. The CPU 495 functions as an authentication processing section 4000, a communication relay section 4010 and an authentication information update section 4020 in accordance with the programs stored in the ROM 480 and the flash ROM 485. The authentication processing section 4000 acquires the authentication information from the authentication information storage section 490 on condition that the power plug 400 is connected to the power socket 35-1. Moreover, to allow the control server 20 to authenticate the communication relay adapter 40-1, the authentication processing section 4000 transmits the authentication information to the control server 20 via the first power line on condition that the power plug 400 is connected to the power socket 35-1.

Here, the authentication information is, for example, information necessary for mutual authentication processing to allow the control server 20 and the communication relay adapter 40-1 to authenticate each other. For example, when this mutual authentication is successful, the communication relay adapter 40-1 can establish a virtual private network (VPN) between the adapter and the contracted service provider server 30. Furthermore, the authentication information may include information indicating that a legal contract has been concluded with the service provider which controls the contracted service provider server 30. That is, the communication relay adapter 40-1 may allow the contracted service provider server 30 to authenticate the communication relay adapter 40-1, thereby receiving data on the services provided by the contracted service provider server 30. As one example, in a case where the contracted service provider server 30 provides the service of on-line karaoke, the communication relay adapter 40-1 can receive karaoke tune data from the contracted service provider server 30 on condition that the authentication is successful. In addition, the authentication information storage section 490 may store an encryption key for performing the cryptographic communication with the server of the communication network 25.

The communication relay section 4010 relays communication data from the information processing device 45 to the communication network 25 on condition that the authentication processing section 4000 has succeeded in the authentication. The authentication information update section 4020 acquires the authentication information from an external device (e.g., the control server 20) via the first power line on condition that the push switch 415 is depressed by the update adapter 50, and updates the authentication information storage section 490 in accordance with the acquired authentication information. It is to be noted that the update adapter 50 may include a function of the control server 20. In this case, each of the communication relay adapters 40-1 to N acquires the authentication information from the update adapter 50.

Figure 6:
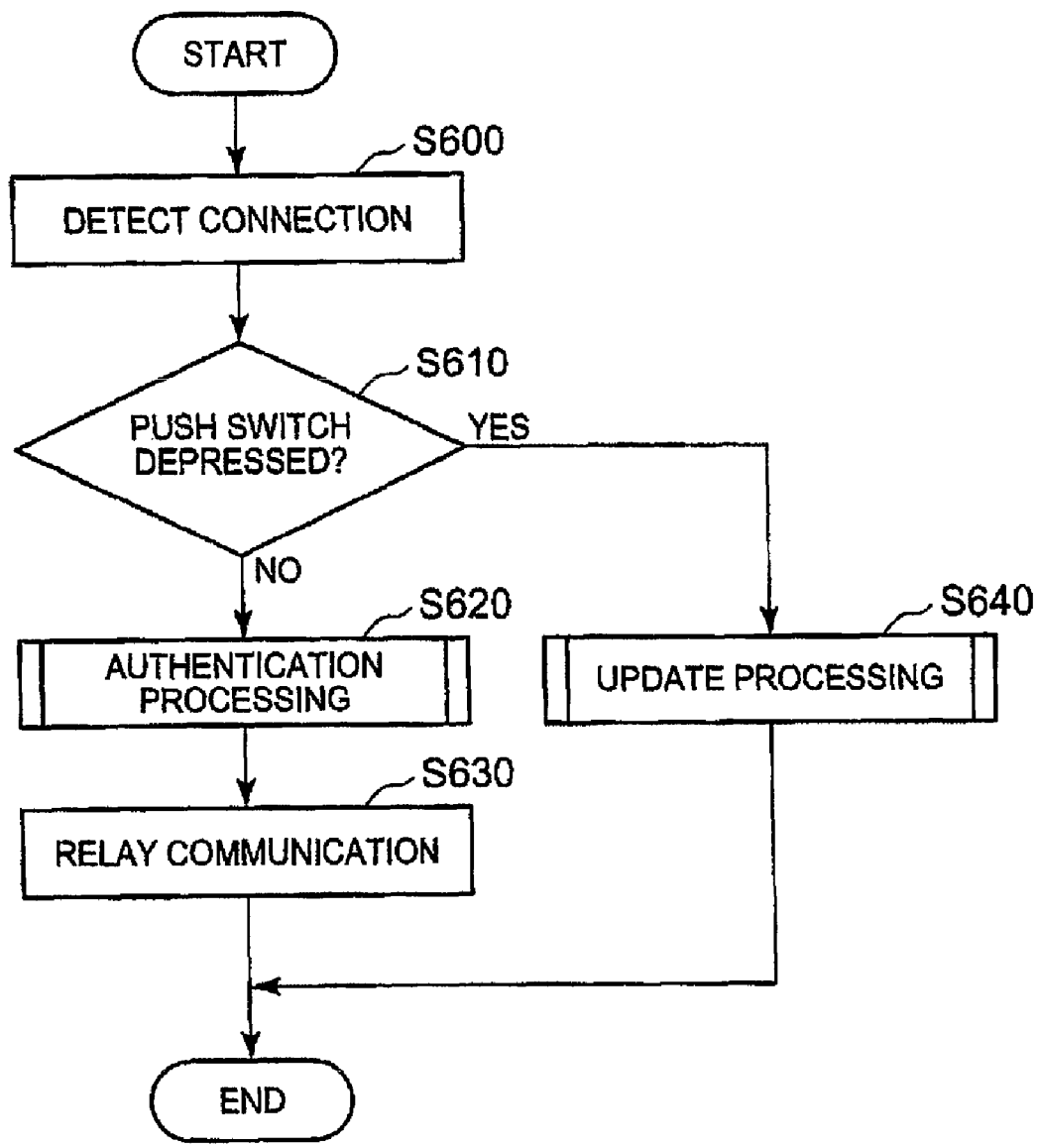
FIG. 6 is a flow chart showing processing by the communication relay adapter 40-1.

FIG. 6 is a flow chart showing processing by the communication relay adapter 40-1. The AC-DC converter 455 detects that the power plug 400 is connected to the power socket 35-1 (S600). For example, the AC-DC converter 455 may determine that the power plug 400 is connected to the power socket 35-1 on condition that a power voltage supplied to the communication relay adapter 40-1 is detected. Next, the authentication processing section 4000 determines whether or not the push switch 415 is depressed (S610).

The authentication processing section 4000 transmits the authentication information to the control server 20 via the first power line to allow the control server 20 to authenticate the communication relay adapter 40-1, on condition that the push switch 415 is not depressed (S610: NO) and that the power plug 400 is connected to the power socket 35-1 (S620). Moreover, the communication relay section 4010 relays the communication data from the information processing device 45 to the communication network 25 on condition that the authentication processing section 4000 has succeeded in the authentication (S630). For example, the communication relay section 4010 may encrypt the communication data from the information processing device 45 to transfer the data to the communication network 25. The communication relay section 4010 may perform processing to charge a fee for relay processing to the user of the communication relay adapter 40-1 on condition that, for example, the relay of the communication data is started.

Figure 7:
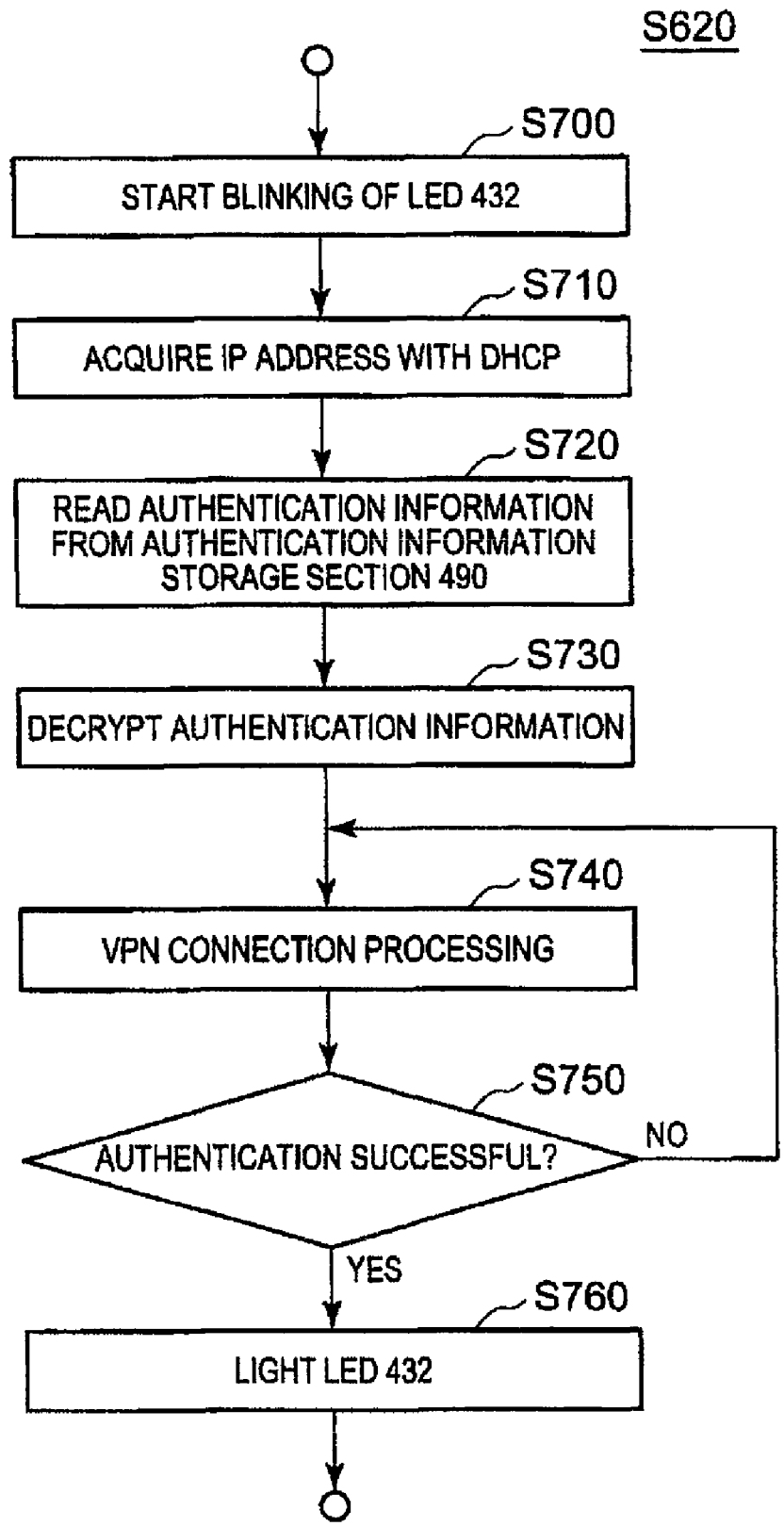
FIG. 7 is a flow chart showing authentication processing by the communication relay adapter 40-1.

FIG. 7 is a flow chart showing the authentication processing by the communication relay adapter 40-1. The authentication processing section 4000 first starts blinking of the LED 432 (S700). Next, the authentication processing section 4000 acquires an IP address from the control server 20 according to a dynamic host configuration protocol (DHCP), and sets the IP address to the communication relay adapter 40-1 (S710).

Next, the authentication processing section 4000 reads the authentication information from the authentication information storage section 490 (S720). Moreover, the authentication processing section 4000 decrypts the encrypted authentication information (S730). Next, the authentication processing section 4000 transmits the authentication information to the control server 20, and allows the control server 20 to authenticate the communication relay adapter 40-1 by use of the authentication information (S740). For example, the authentication processing section 4000 may perform the mutual authentication with the control server 20 to be thereby connected to the virtual private network (VPN). As one example, the communication relay adapter 40-1 and the control server 20 may use the challenge & response mechanism with each other to thereby perform the mutual authentication. The authentication processing section 4000 may return to the processing of S740 to retry the authentication on condition that the authentication fails (S750: NO).

On the other hand, the authentication processing section 4000 lights the LED 432 (S760) on condition that the power plug 400 has succeeded in the authentication (S750: YES).

Figure 8:
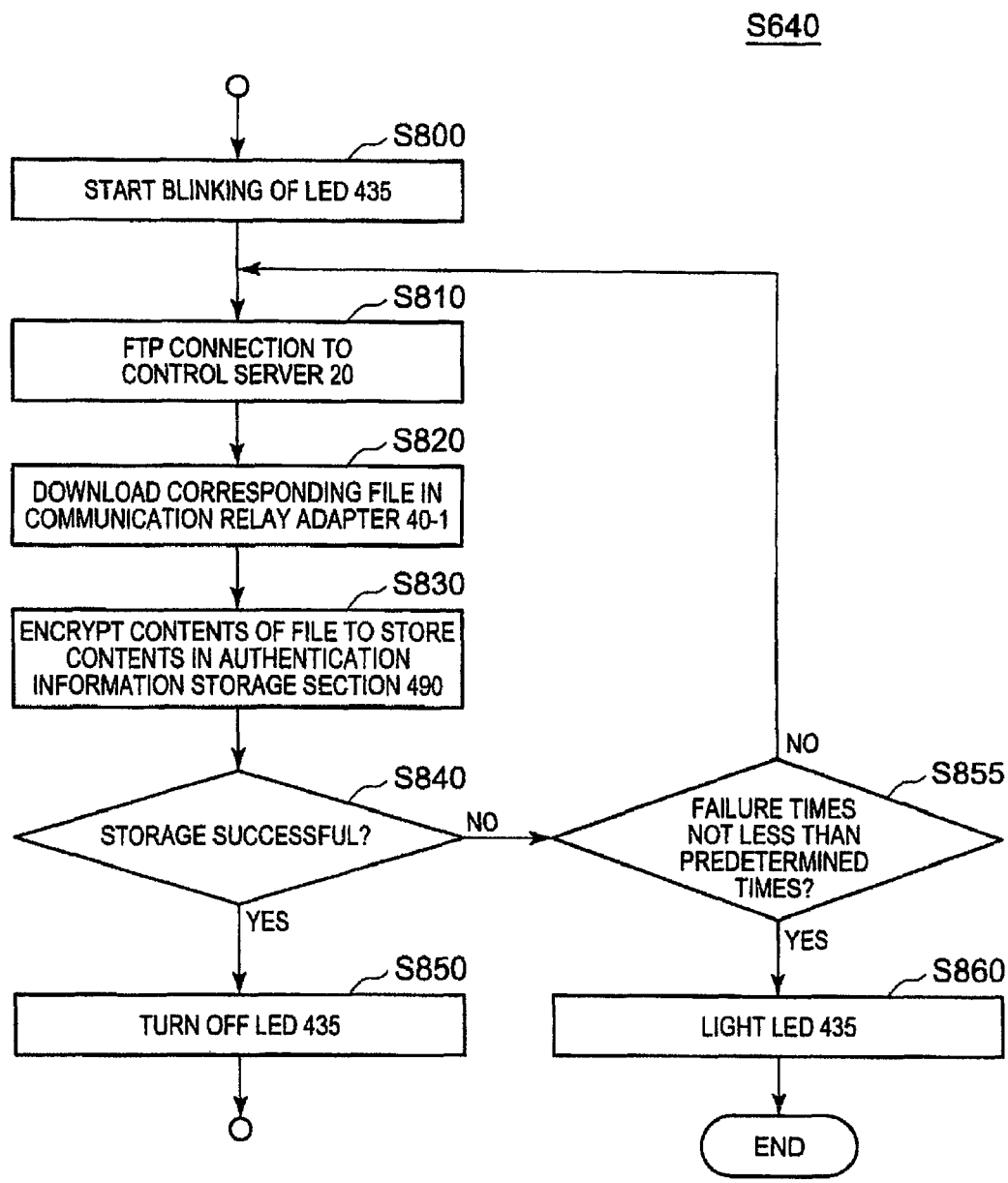
FIG. 8 is a flow chart showing update processing of authentication information by the communication relay adapter 40-1.

FIG. 8 is a flow chart showing the update processing of the authentication information by the communication relay adapter 40-1. The authentication information update section 4020 starts blinking of the LED 435 (S800). Next, the authentication information update section 4020 is connected to the control server 20 according to a file transfer protocol (FTP) (S810). Moreover, the authentication information update section 4020 downloads, from the control server 20, a file stored in accordance with the communication relay adapter 40-1 (S820). That is, in the control server 20, for example, the file including the authentication information to be stored in the communication relay adapter is stored beforehand in association with communication relay adapter device identification information (e.g., an MAC address) or the like on each of the communication relay adapters 40-1 to N. Furthermore, the authentication information update section 4020 downloads, from the control server 20, the file corresponding to the device identification information or the like of the communication relay adapter 40-1.

Next, the authentication information update section 4020 encrypts contents of the downloaded file to store the contents in the authentication information storage section 490. In a case where the storage is successful (S840: YES), the authentication information update section 4020 turns off the LED 435 (S850). On the other hand, in a case where the storage fails (S840: YES), the communication relay adapter 40-1 determines whether or not the number of times of continuous failures in the storage is not less than a predetermined number of the times (S855). When the number is less than the predetermined number of the times (S855: NO), the communication relay adapter 40-1 returns to the processing of S810 to retry the FTP connection with respect to the control server 20. On the other hand, in a case where the number is not less than the predetermined number of the times (S855: YES), the communication relay adapter 40-1 brings the LED 435 into a state in which the LED constantly lights (S860). As a result, the user is informed of any trouble and prompted to fix it.

Figure 9:
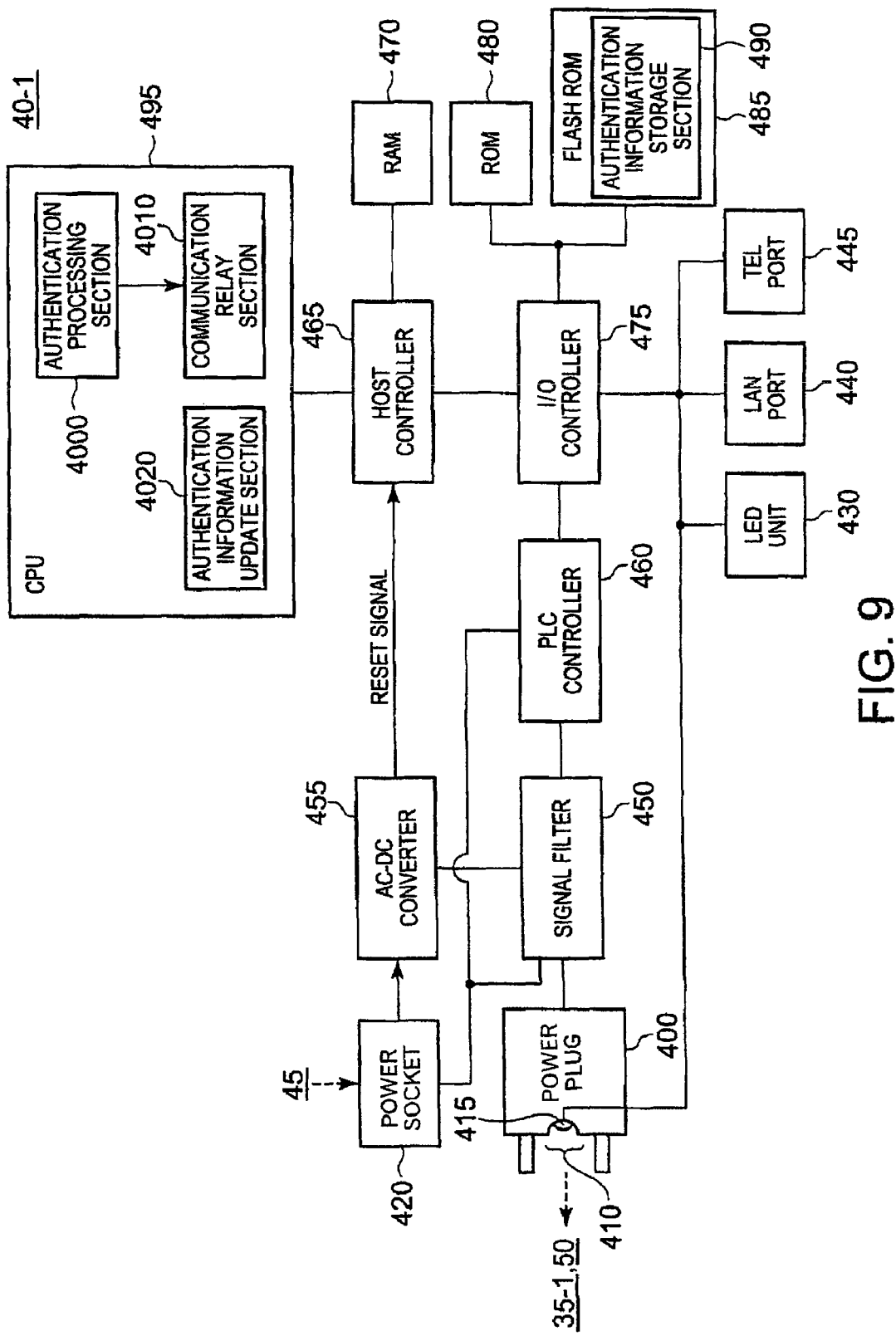
FIG. 9 shows functional blocks of classified functions of a communication relay adapter 40-1 according to a first modification.

FIG. 9 shows functional blocks of classified functions of a communication relay adapter 40-1 according to a first modification. In the same manner as in the communication relay adapter 40-1 shown in FIG. 5, the communication relay adapter 40-1 of the present modification has a power plug 400, a power socket 420, an LED unit 430, an LAN port 440, a TEL port 445, a signal filter 450, an AC-DC converter 455, a PLC controller 460, a host controller 465, a RAM 470, an I/O controller 475, a ROM 480, a flash ROM 485 and a CPU 495.

However, the communication relay adapter 40-1 of the present modification does not start the operation on condition that the adapter is connected to the power socket 35-1 for connecting an electric device to a power line, but the communication relay adapter 40-1 of the present modification starts the operation to allow the control server 20 to authenticate the communication relay adapter 40-1, on condition that the adapter is plugged into the power plug of the information processing device 45. In consequence, unlike the communication relay adapter 40-1 shown in FIGS. 1 to 8, the modification has an object to delay start of authentication processing just until communication is actually performed and save power consumption.

Specifically, instead of the function of the member denoted with the same reference numeral 455 in FIG. 5, the AC-DC converter 455 detects that the power plug of the information processing device 45 is plugged into the power socket 420. The AC-DC converter 455 sends a reset signal to the host controller 465 on condition that the power plug of the information processing device 45 is plugged into the power socket 420. Moreover, the AC-DC converter 455 starts processing to convert AC power into DC power to supply the DC power to each section of the communication relay adapter 40-1. As a result, the authentication processing section 4000 transmits authentication information to the control server 20 via the first power line in order to allow the control server 20 to authenticate the communication relay adapter 40-1. Since functions of the other members shown in the drawing are substantially the same as those of the members denoted with the same reference numerals in FIG. 5, descriptions thereof are omitted.

Figure 10A:
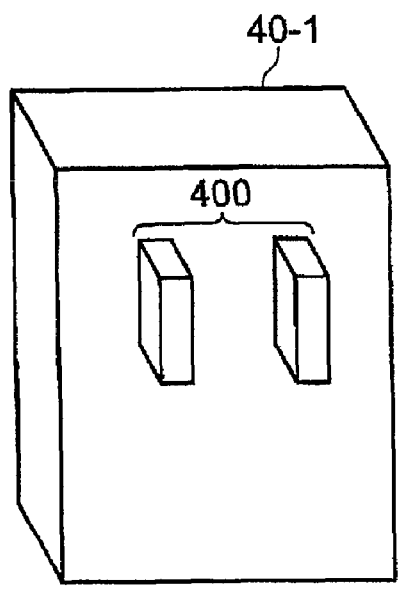
FIG. 10 shows a perspective view of the communication relay adapter 40-1 according to a second modification.
Figure 10B:
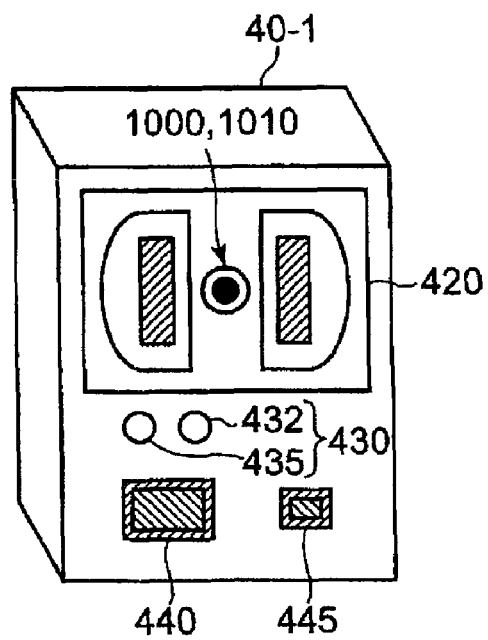

FIG. 10 shows a perspective view of a communication relay adapter 40-1 of a second modification. FIG. 10(a) shows a perspective view of a back surface of the communication relay adapter 40-1, and FIG. 10(b) shows a perspective view of a front surface of the communication relay adapter 40-1. FIG. 11 shows surfaces of the communication relay adapter 40-1 according to the second modification. FIG. 11(a) shows a front view of the communication relay adapter 40-1, FIG. 11(b) shows a top plan view of the communication relay adapter 40-1, and FIG. 11(c) shows a bottom plan view of the communication relay adapter 40-1. FIG. 11(d) shows a left side view of the communication relay adapter 40-1, and FIG. 11(e) shows a right side view of the communication relay adapter 40-1. FIG. 12 shows surfaces of an update adapter 50. FIG. 12(a) shows a front view of the update adapter 50, FIG. 12(b) shows a top plan view of the update adapter 50, and FIG. 12(c) shows a bottom plan view of the update adapter 50. FIG. 12(d) shows a left side view of the update adapter 50, and FIG. 12(e) shows a right side view of the update adapter 50.

The communication relay adapter 40-1 has a power plug 400, a power socket 420, an LED unit 430, an LAN port 440 and a TEL port 445. The power plug 400 is detachably attached to the power socket which connects an electric device to a first power line. Moreover, the power plug 400 receives AC power from the first power line. The power socket 420 supplies the power to an information processing device 45 via the second power line. The power socket 420 has a concave portion 1000 and a push switch 1010 disposed in the concave portion 1000.

The concave portion 1000 is disposed in the surface of the socket which faces the power plug. Moreover, the push switch 1010 is depressed, when the power plug of the update adapter 50 having the convex portion 55 disposed in the surface of the adapter facing the power socket 420 is plugged into the power socket 420. It is to be noted that the push switch 1010 is not depressed in a state in which a usual power plug is plugged into the power socket 420.

As described above, according to the present modification, the push switch 1010 constituting a condition for updating authentication information is disposed in the power socket 420, instead of the power plug 400. Moreover, this push switch 1010 is depressed in a case where the update adapter 50 is plugged into the communication relay adapter 40-1, instead of a case where the communication relay adapter 40-1 is plugged into the update adapter 50. Even according to such a constitution, wrong change of the authentication information or the like can appropriately be prevented.

Figure 13:
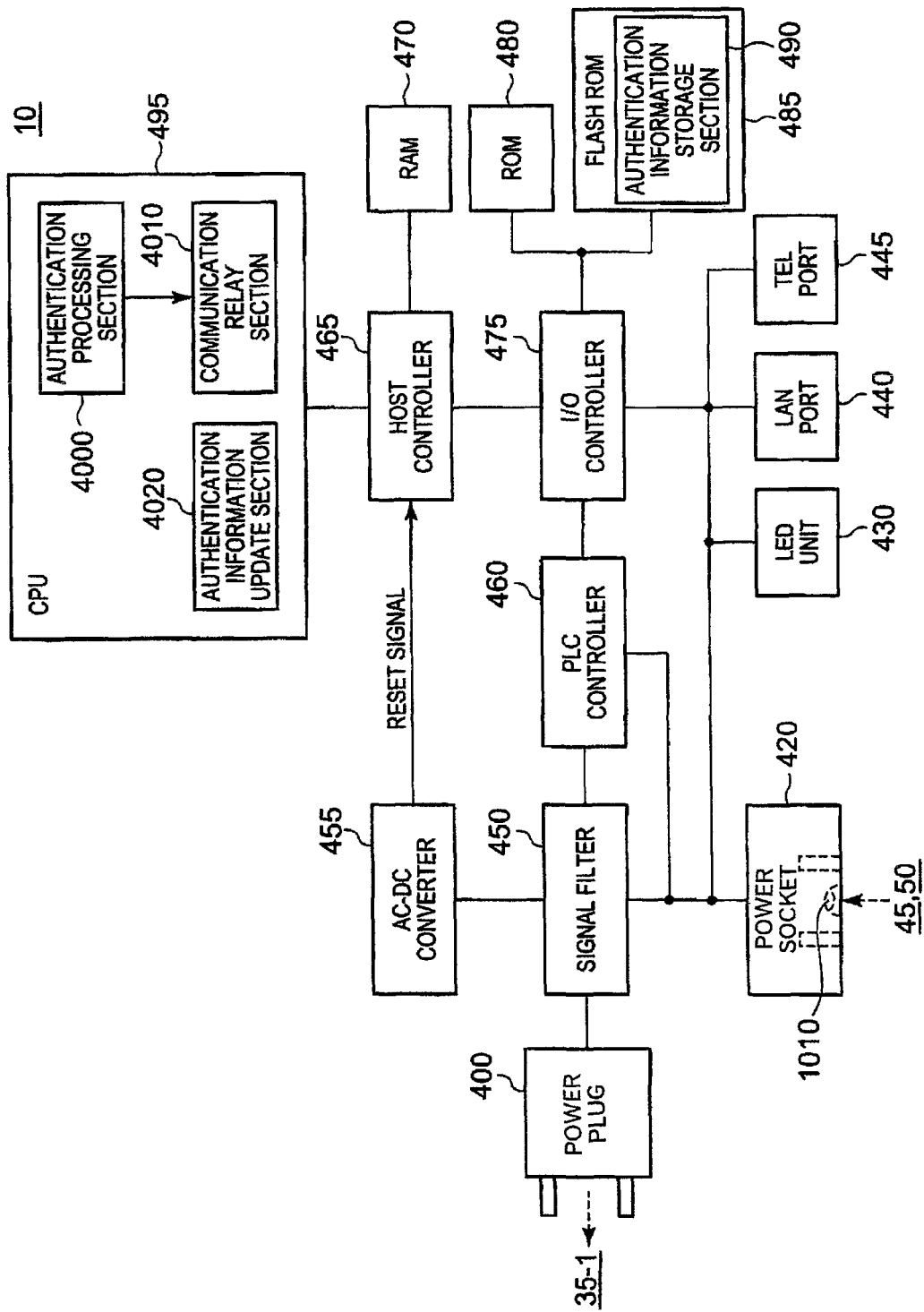
FIG. 13 shows functional blocks of classified functions of the communication relay adapter 40-1 according to the second modification.

FIG. 13 shows functional blocks of classified functions of the communication relay adapter 40-1 according to the second modification. In addition to the power plug 400, the power socket 420, the LED unit 430, the LAN port 440 and the TEL port 445, the communication relay adapter 40-1 has a signal filter 450, an AC-DC converter 455, a PLC controller 460, a host controller 465, a RAM 470, an I/O controller 475, a ROM 480, a flash ROM 485 and a CPU 495. An authentication information update section 4020 updates an authentication information storage section 490 in accordance with the authentication information acquired from the update adapter 50 as an external device via the power line on condition that the push switch 1010 is depressed. Since functions of the other members are substantially the same as those of the members denoted with the same reference numerals shown in FIG. 5, descriptions thereof are omitted.

Figure 14:
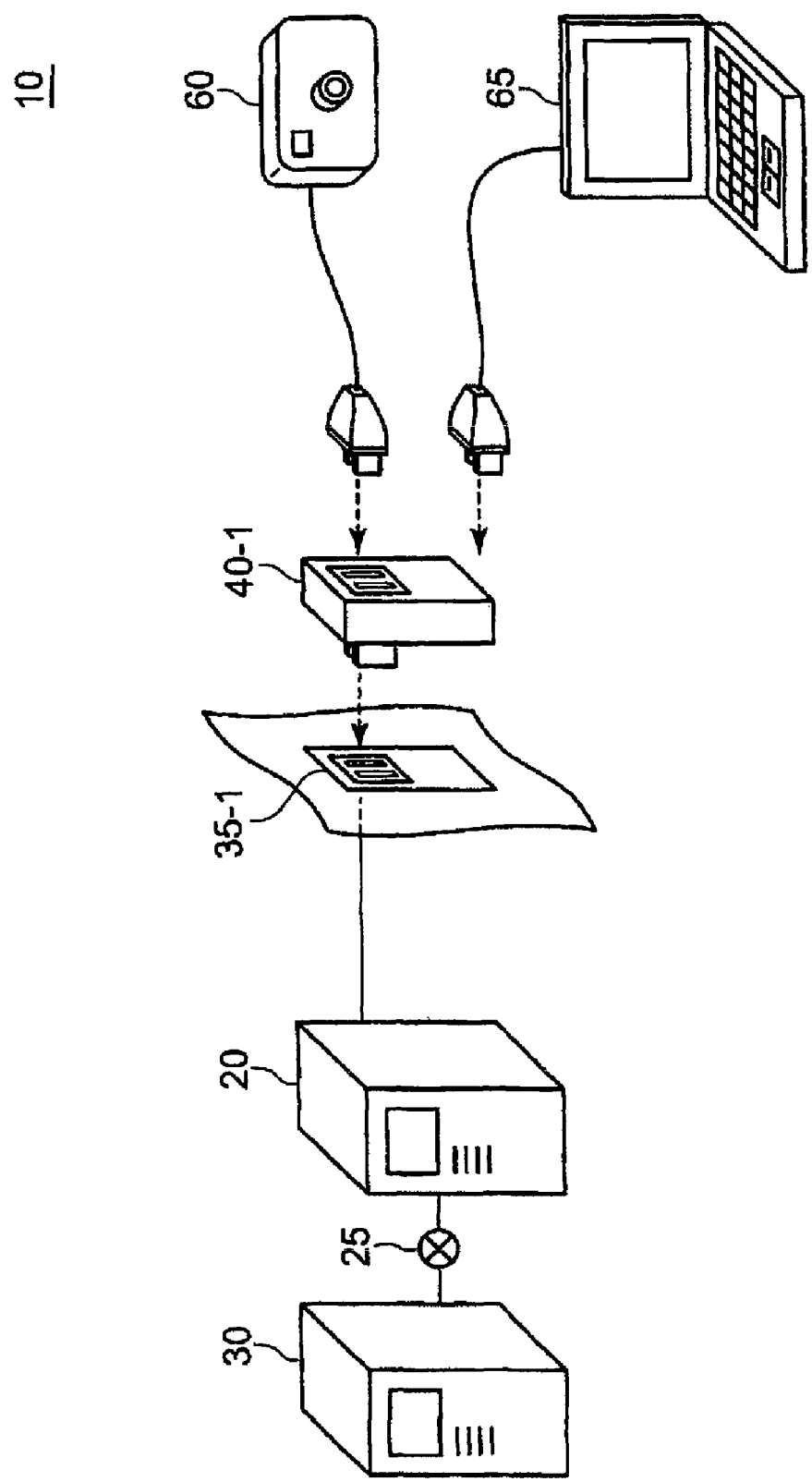
FIG. 14 shows an application example of the present embodiment.

FIG. 14 shows an application example of the present embodiment. In the same manner as in the information processing system 10 shown in FIG. 1, an information processing system 10 of the present example includes a control server 20, a contracted service provider server 30 connected to the control server 20 via a communication network 25, a power socket 35-1 connected to the control server 20 via a power line and a communication relay adapter 40-1 detachably attached to the power socket 35-1. In addition, the information processing system 10 has a digital camera 60 which is relayed by the communication relay adapter 40-1 to perform communication between the camera and the contracted service provider server 30 of the communication network 25, and an information processing device 65 which is relayed by the communication relay adapter 40-1 to perform communication between the device and the contracted service provider server 30 of the communication network 25.

Moreover, the contracted service provider server 30 is one example of a storage server according to the present invention, and performs a service to provide a recording area in which image data or the like of images taken with the digital camera 60 or the like by a contracted user and the like are recorded. The communication relay section 4010 of the communication relay adapter 40-1 identifies a type of a connected device in a case where the digital camera 60 or the information processing device 65 is connected to the communication relay adapter 40-1. Moreover, on condition that the authentication by the authentication processing section 4000 is successful and that the digital camera 60 is connected, the communication relay section 4010 acquires the image data from the digital camera 60 to store the data in the contracted service provider server 30.

On the other hand, on condition that the authentication by the authentication processing section 4000 is successful and that the information processing device 65 is connected, the communication relay section 4010 acquires the image data from the contracted service provider server 30 to store the data in the information processing device 65. Furthermore, in this case, the communication relay section 4010 may perform processing to charge a fee for use of an image retaining service to the user of the information processing device 65 or the digital camera 60. As described above, according to the present application example, the images taken with the digital camera can be stored in the contracted service provider server 30, by simply connecting the digital camera 60 to the communication relay adapter 40-1, without performing any other operation. Moreover, the images stored in the contracted service provider server 30 can be retrieved in the information processing device 65, by simply connecting the information processing device 65 to the communication relay adapter 40-1, without performing any other operation.

According to this application example, for example, a use method is possible in which images taken by a journalist at a place where materials for an article are gathered is successively transmitted beforehand to a server via a power line installed at the place, and the images are retrieved in a personal computer of the journalist after the journalist comes back. The processing to transmit the image to the server may automatically be performed in response to start of electric charging after connecting the digital camera 60 to the power line. In this case, since the user does not have to perform the operation every time the image is transmitted, convenience can further be improved.

The present invention has been described above in accordance with the embodiment, but a technical region of the present invention is not limited to a region described above in the embodiment. It is obvious for any person skilled in the art that various modifications or improvements can be added. It is apparent from descriptions of claims that configurations to which such modifications or improvements have been added are also included in the technical region of the present invention.

The invention claimed is:

1. A relay adapter comprising components, wherein the components of the relay adapter comprise:
   an authentication information storage section that stores encrypted authentication information of the relay adapter;
   a power plug at a front surface of the relay adapter;
   a power socket and at a back surface of the relay adapter, and
   a push switch disposed within a concave portion of either the power plug or the power socket of the relay adapter and configured to be depressed by a convex portion of an update adapter within the concave portion while the relay adapter is either plugged into the update adapter or the update adapter is plugged into the relay adapter,
   wherein the components of the relay adapter are configured to perform a method for processing communication data, said method comprising:
      detecting that the power plug of the relay adapter is plugged into a power socket of a user, wherein the power socket of the user is connected to a control server by a power line carrying a power signal, wherein said detecting comprises detecting a power voltage supplied to the relay adapter by the power signal;
      ascertaining that the push switch is not depressed;
      responsive to said ascertaining that the push switch is not depressed, enabling mutual authentication between the relay adapter and the control server; and
      after said performing authentication has been successfully completed, relaying the communication data from an information processing device of the user to a service provider server via the control server, wherein the service provider server is coupled to the control server by a communication network.

2. The relay adapter of claim 1, wherein components of the relay adapter further comprise a Light Emitting Diode (LED) unit at the back surface of the relay adapter, wherein the LED unit comprises a first LED adapted to blink during performance of said authentication with the control server, and wherein the LED unit comprises a first LED adapted to blink during performance of an update processing of the authentication information.

3. The relay adapter of claim 2, wherein said enabling mutual authentication comprises:
   blinking the first LED;
   after said blinking the first LED, reading the encrypted authentication information from the authentication information storage section;
   decrypting the encrypted authentication information that was read from the authentication information storage section;
   after said decrypting, transmitting the authentication information to the control server to allow the control server to authenticate the relay adapter by use of the authentication information; and
   after the relay adapter has been successfully authenticated following said transmitting the authentication information, lighting the first LED.

4. The relay adapter of claim 3, wherein the update adapter comprises an authentication information update section, and wherein the method further comprises:
   while the power plug of the relay adapter is not connected to the power socket of the user and either the relay adapter is plugged into the update adapter or the update adapter is plugged into the relay adapter, determining that the push switch is depressed;
   responsive to determining that the push switch is depressed, blinking the second LED;
   after said blinking the second LED, connecting the authentication information update section to the control server;
   after said connecting the authentication information update section, downloading update authentication information from the control server to the authentication information update section;
   encrypting the downloaded update authentication information;
   storing the encrypted update authentication information in the authentication information storage section; and
   after said storing the encrypted update authentication information has been successfully performed, turning off the second LED.

5. The relay adapter of claim 3, wherein the convex portion of the update adapter is a convex portion of the power socket of the update adapter, and during performance of said determining that the push switch is depressed:
   the push switch is disposed within a concave portion of the power plug of the relay adapter; and
   the relay adapter is plugged into the update adapter such that the convex portion of the update adapter is depressing the push switch.

6. The relay adapter of claim 5, wherein the convex portion of the update adapter is a convex portion of the power plug of the update adapter, and during performance of said determining that the push switch is depressed:
   the push switch is disposed within a concave portion of the power socket of the relay adapter; and
   the update adapter is plugged into the relay adapter such that the convex portion of the update adapter is depressing the push switch.

7. The relay adapter of claim 1, wherein the components of the relay adapter further comprise an AC-DC converter electrically coupled to the power plug of the relay adapter, and wherein said detecting the power voltage is performed by the AC-DC converter.

8. A method for processing communication data through use of a relay adapter, said method comprising providing the relay adapter, wherein the relay adapter comprises:
   an authentication information storage section that stores encrypted authentication information of the relay adapter;
   a power plug at a front surface of the relay adapter;
   a power socket and at a back surface of the relay adapter, and
   a push switch disposed within a concave portion of either the power plug or the power socket of the relay adapter and configured to be depressed by a convex portion of an update adapter within the concave portion while the relay adapter is either plugged into the update adapter or the update adapter is plugged into the relay adapter,
   wherein the method further comprises:
   detecting that the power plug of the relay adapter is plugged into a power socket of a user, wherein the power socket of the user is connected to a control server by a power line carrying a power signal, wherein said detecting comprises detecting a power voltage supplied to the relay adapter by the power signal;
   ascertaining that the push switch is not depressed;
   responsive to said ascertaining that the push switch is not depressed, enabling mutual authentication between the relay adapter and the control server; and
   after said performing authentication has been successfully completed, relaying the communication data from an information processing device of the user to a service provider server via the control server, wherein the service provider server is coupled to the control server by a communication network, and wherein said detecting, said enabling mutual authentication, and said relaying are performed by the relay adapter.

9. The method of claim 8, wherein the relay adapter further comprises a Light Emitting Diode (LED) unit at the back surface of the relay adapter, wherein the LED unit comprises a first LED adapted to blink during a performance of authentication with the control server, and wherein the LED unit comprises a first LED adapted to blink during a performance of update processing of the authentication information.

10. The method of claim 9, wherein said enabling mutual authentication comprises:
   blinking the first LED;
   after said blinking the first LED, reading the encrypted authentication information from the authentication information storage section;
   decrypting the encrypted authentication information that was read from the authentication information storage section;
   after said decrypting, transmitting the authentication information to the control server to allow the control server to authenticate the relay adapter by use of the authentication information; and
   after the relay adapter has been successfully authenticated following said transmitting the authentication information, lighting the first LED.

11. The method of claim 9, wherein the update adapter comprises an authentication information update section, and wherein the method further comprises:
   while the power plug of the relay adapter is not connected to the power socket of the user and either the relay adapter is plugged into the update adapter or the update adapter is plugged into the relay adapter, determining that the push switch is depressed;

responsive to determining that the push switch is depressed, blinking the second LED;

after said blinking the second LED, connecting the authentication information update section to the control server;

after said connecting the authentication information update section, downloading update authentication information from the control server to the authentication information update section;

encrypting the downloaded update authentication information;

storing the encrypted update authentication information in the authentication information storage section; and after said storing the encrypted update authentication information has been successfully performed, turning off the second LED.

12. The method of claim 11, wherein the convex portion of the update adapter is a convex portion of the power socket of the update adapter, and during performance of said determining that the push switch is depressed:

the push switch is disposed within a concave portion of the power plug of the relay adapter; and the relay adapter is plugged into the update adapter such that the convex portion of the update adapter is depressing the push switch.

13. The method of claim 11, wherein the convex portion of the update adapter is a convex portion of the power plug of the update adapter, and during performance of said determining that the push switch is depressed:

the push switch is disposed within a concave portion of the power socket of the relay adapter; and the update adapter is plugged into the relay adapter such that the convex portion of the update adapter is depressing the push switch.

14. The method of claim 8, wherein the relay adapter further comprises an AC-DC converter electrically coupled to the power plug of the relay adapter, and wherein said detecting the power voltage is performed by the AC-DC converter.

15. A computer program product, comprising a memory and programs stored thereon, wherein the memory is selected from the group consisting of read-only memory (ROM), random access memory (ROM), and a combination thereof, wherein the memory is coupled to the processor, wherein the programs are configured to control performance of the method of claim 8 upon being executed on the processor, and wherein the relay adaptor comprises the memory and the processor.

16. A process for a service provider to lease a relay adapter to a user, said process comprising:

leasing, by the service provider, the relay adapter to the user such that the user is required to pay the independent service provider a fee for use of the relay adapter by the user to relay communication data from an information processing device of the user to a service provider server, wherein the relay adapter comprises:

an authentication information storage section that stores encrypted authentication information of the relay adapter;

a power plug at a front surface of the relay adapter;

a power socket and at a back surface of the relay adapter, and a push switch disposed within a concave portion of either the power plug or the power socket of the relay adapter and configured to be depressed by a convex portion of an update adapter within the concave portion while the relay adapter is either plugged into the update adapter or the update adapter is plugged into the relay adapter, wherein the relay adapter is configured to perform a method for processing the communication data, said method comprising:

detecting that the power plug of the relay adapter is plugged into a power socket of the first user, wherein the power socket of the user is connected to a control server by a power line carrying a power signal, wherein said detecting comprises detecting a power voltage supplied to the relay adapter by the power signal;

ascertaining that the push switch is not depressed;

responsive to said ascertaining that the push switch is not depressed, enabling mutual authentication between the relay adapter and the control server; and after said performing authentication has been successfully completed, relaying the communication data from the information processing device to the service provider server via the control server, wherein the service provider server is coupled to the control server by a communication network.

17. The process of claim 16, wherein the method further comprises:

after said performing authentication has been successfully completed and before said relaying is performed, establishing a virtual private network (VPN) between the relay adapter and another service provider that controls the service provider server, wherein said establishing is performed by the relay adapter.

18. The process of claim 17, wherein the control processor and the update adapter are installed within an environment of a Power Line Communication (PLC) service provider, and wherein the service provider server is installed within the environment of the PLC service provider under a contract between the another service provider and the PLC service provider.

19. The process of claim 16, wherein the relay adapter further comprises a Light Emitting Diode (LED) unit at the back surface of the relay adapter, wherein the LED unit comprises a first LED adapted to blink during a performance of authentication with the control server, and wherein the LED unit comprises a first LED adapted to blink during a performance of update processing of the authentication information.

20. The process of claim 19, wherein said enabling mutual authentication comprises:

blinking the first LED;

after said blinking the first LED, reading the encrypted authentication information from the authentication information storage section;

decrypting the encrypted authentication information that was read from the authentication information storage section;

after said decrypting, transmitting the authentication information to the control server to allow the control server to authenticate the relay adapter by use of the authentication information; and after the relay adapter has been successfully authenticated following said transmitting the authentication information, lighting the first LED.

21. The process of claim 19, wherein the update adapter comprises an authentication information update section, and wherein the method further comprises:

while the power plug of the relay adapter is not connected to the power socket of the user and either the relay adapter is plugged into the update adapter or the update adapter is plugged into the relay adapter, determining that the push switch is depressed;

responsive to determining that the push switch is depressed, blinking the second LED;

after said blinking the second LED, connecting the authentication information update section to the control server;

after said connecting the authentication information update section, downloading update authentication information from the control server to the authentication information update section;

encrypting the downloaded update authentication information;

storing the encrypted update authentication information in the authentication information storage section; and after said storing the encrypted update authentication information has been successfully performed, turning off the second LED.

22. The process of claim 21, wherein the convex portion of the update adapter is a convex portion of the power socket of the update adapter, and during performance of said determining that the push switch is depressed:
- the push switch is disposed within a concave portion of the power plug of the relay adapter; and
- the relay adapter is plugged into the update adapter such that the convex portion of the update adapter is depressing the push switch.

23. The process of claim 21, wherein the convex portion of the update adapter is a convex portion of the power plug of the update adapter, and during performance of said determining that the push switch is depressed:
- the push switch is disposed within a concave portion of the power socket of the relay adapter; and
- the update adapter is plugged into the relay adapter such that the convex portion of the update adapter is depressing the push switch.

* * * * *